United States Patent
Hall

(10) Patent No.: US 7,984,798 B1
(45) Date of Patent: Jul. 26, 2011

(54) ELECTRIC CORD REEL

(75) Inventor: John Hall, Napa, CA (US)

(73) Assignee: John Ernest Hall, Napa, CA (US)

( * ) Notice: Subject to any disclaimer, the term of this patent is extended or adjusted under 35 U.S.C. 154(b) by 0 days.

(21) Appl. No.: 12/655,475

(22) Filed: Dec. 31, 2009

(51) Int. Cl.
*B66C 13/12* (2006.01)

(52) U.S. Cl. .................. 191/12 R; 191/12.2 R; 191/12.4

(58) Field of Classification Search ............... 191/12 R, 191/12.2 R, 12.4, 12 A
See application file for complete search history.

(56) References Cited

U.S. PATENT DOCUMENTS

| | | | | |
|---|---|---|---|---|
| 3,369,084 A * | 2/1968 | Cook | ............................ | 191/12.4 |
| 3,782,654 A * | 1/1974 | Kasa | ............................ | 242/388.1 |
| 3,835,267 A * | 9/1974 | Sharpe | ............................ | 191/12.4 |
| 3,840,713 A * | 10/1974 | Carpentier | ............... | 191/12.2 R |
| 3,876,045 A * | 4/1975 | Knarreborg | ............... | 191/12.2 R |
| 3,880,378 A * | 4/1975 | Ballenger | ................... | 242/388.6 |
| 4,061,290 A * | 12/1977 | Harrill | ............................ | 242/402 |
| 4,083,621 A * | 4/1978 | Davidson et al. | ............. | 439/501 |
| 4,136,840 A * | 1/1979 | Bates | ............................ | 242/395.1 |
| 4,244,536 A * | 1/1981 | Harrill | ............................ | 242/405.3 |
| 4,721,833 A * | 1/1988 | Dubay | ............................ | 191/12.4 |
| 4,726,538 A * | 2/1988 | Kovacik et al. | ................ | 242/376 |
| 5,101,082 A * | 3/1992 | Simmons et al. | ......... | 191/12.2 R |
| 5,195,823 A * | 3/1993 | Sidabras | ........................ | 362/387 |
| 5,236,371 A * | 8/1993 | Matthis | ........................... | 439/501 |
| 5,381,981 A * | 1/1995 | Nelson | ........................ | 242/407.1 |
| 5,418,701 A * | 5/1995 | Hart | ................................ | 362/376 |
| D365,012 S * | 12/1995 | Sather | ............................ | D8/359 |
| 5,645,147 A * | 7/1997 | Kovacik et al. | ........... | 191/12.2 R |
| 5,732,898 A * | 3/1998 | Odessky et al. | ................ | 242/377 |
| 6,176,433 B1 * | 1/2001 | Uesaka et al. | ................. | 235/492 |
| 6,273,354 B1 * | 8/2001 | Kovacik et al. | ................ | 242/404 |
| 6,439,360 B1 * | 8/2002 | Miller | ........................ | 191/12.2 R |
| 6,517,022 B1 * | 2/2003 | Bailey | .......................... | 242/388.1 |
| 6,779,749 B2 * | 8/2004 | Laporta | ......................... | 242/395 |
| 7,044,278 B2 * | 5/2006 | Cleveland | .................... | 191/12.4 |
| 7,073,529 B1 * | 7/2006 | Harkey | ...................... | 137/355.23 |
| 2004/0188558 A1 * | 9/2004 | Moon et al. | ................ | 242/403.1 |

* cited by examiner

*Primary Examiner* — Joe Morano, IV
*Assistant Examiner* — Jason C Smith

(57) ABSTRACT

Electric cord reel with a reel, a crank and handle, a reel support structure, a base structure, a guide aperture and a cord and plug retaining tube the reel is rotatably attached to the reel support structure. The handle fixedly attached to the pivot point of the reel wall. The support structure is fixedly attached to the base structure. The guide aperture fixedly attached to the base structure so that it is in alignment with the spool portion of the reel. The cord and plug retaining tube is removably attached to left and right apertures in the walls of the reel. A standard extension cord portion and plug can be removably retained within the cord and plug retaining tube. A preferred embodiment includes the base structure having a plurality of downwardly facing legs that help keep the structure from sliding when a user pulls on the electric cord.

1 Claim, 4 Drawing Sheets

ELECTRIC CORD REEL

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of cord organizing appliances and more specifically to an electric cord reel.

Extension cords are often used when doing yard work involving electrically powered tools.

The extension cords tend to become tangled either during use or in the storage mode.

To solve this problem, the use of a reel to wind up the cord is advantageous. To this end, a number of inventors have proposed reel designs to help keep cords from becoming tangled. Patents that show this type of solution include the following patents presented in chronological order:

U.S. Pat. No. 3,782,654
U.S. Pat. No. 3,876,045
U.S. Pat. No. 3,880,378
U.S. Pat. No. 4,061,290
U.S. Pat. No. 4,136,840
U.S. Pat. No. 4,244,536
U.S. Pat. No. 5,101,082
U.S. Pat. No. 5,236,371
U.S. Pat. No. 5,732,898
U.S. Pat. No. 6,176,433
U.S. Pat. No. 6,439,360
U.S. Pat. No. 6,517,022

However there is a deficiency in the prior technology because the prior art does not include all the novel and helpful features contained within one embodiment presented herein including, the ability to use any extension cord, having a cord guide aperture, having a tip proof support structure and to allow easy access to either the male end of the extension cord or the female end of the extension cord.

BRIEF SUMMARY OF THE INVENTION

The primary object of the invention is to provide a cord reel that is stable and does not tip over when the cord is pulled from the reel.

Another object of the invention is to provide a cord reel where the cord is easy to reel in and out.

Another object of the invention is to provide a cord reel that is able to connect with any amount of cord being extended from the reel.

A further object of the invention is to provide a cord reel that can accommodate any available extension cord.

Yet another object of the invention is to provide a cord reel assembly that helps guide the cord back onto the reel.

Still yet another object of the invention is to provide a cord reel assembly that allows the user access to either the male or female end of the cord.

Another object of the invention is to provide a cord reel that allows the user to move freely within the length of the extended cord.

Another object of the invention is to provide a cord reel that can accommodate a wide variety of lengths or weights of extension cords.

A further object of the invention is to provide a cord reel that is easy and economical to manufacture.

Yet another object of the invention is to provide a cord reel that does not easily slide when the cord is being pulled out.

Still yet another object of the invention is to provide a cord reel that can be hung up for storage or use in the hung position.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an electric cord reel comprising: a reel, a crank and handle, a reel support structure, a base structure, a guide aperture, a cord and plug retaining tube, said reel rotatably attached to said reel support structure, said handle fixedly attached to the pivot point of said reel wall, said support structure fixedly attached to said base structure, said guide aperture fixedly attached to said base structure so that it is in alignment with the spool portion of said reel, said cord and plug retaining tube removably attached to left and right apertures in the walls of said reel, and a standard extension cord portion and plug able to be removably retained within said cord and plug retaining tube.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
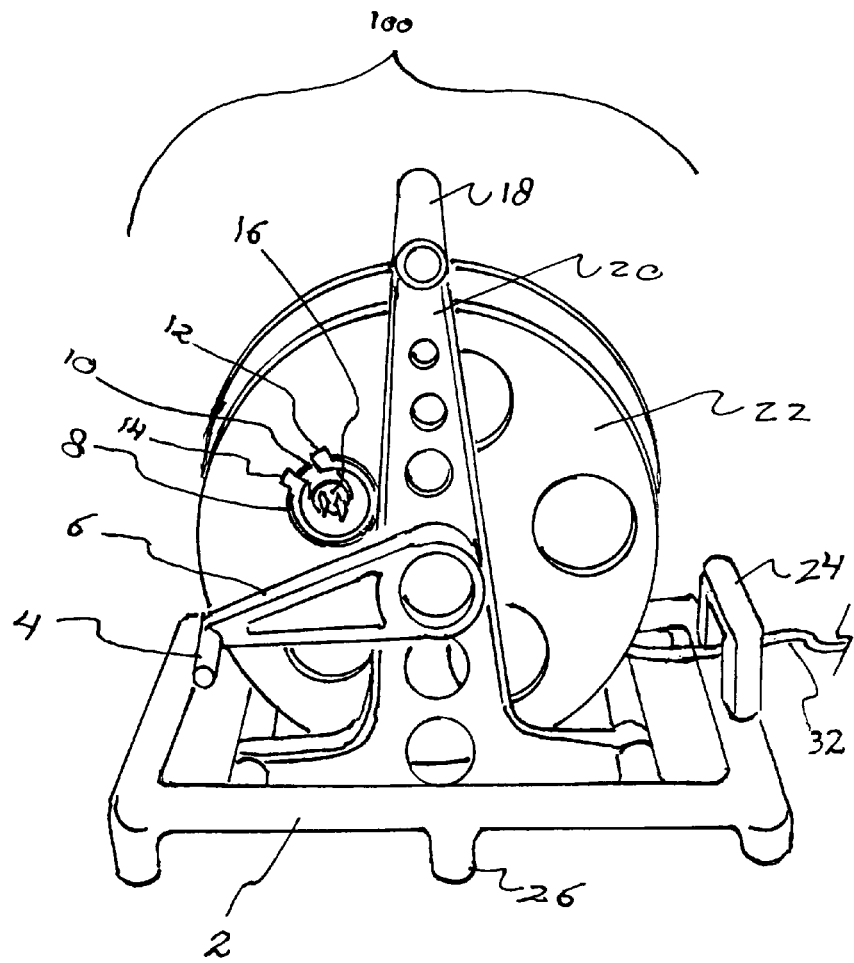
FIG. 1 is a perspective view of the invention.
Figure 2:
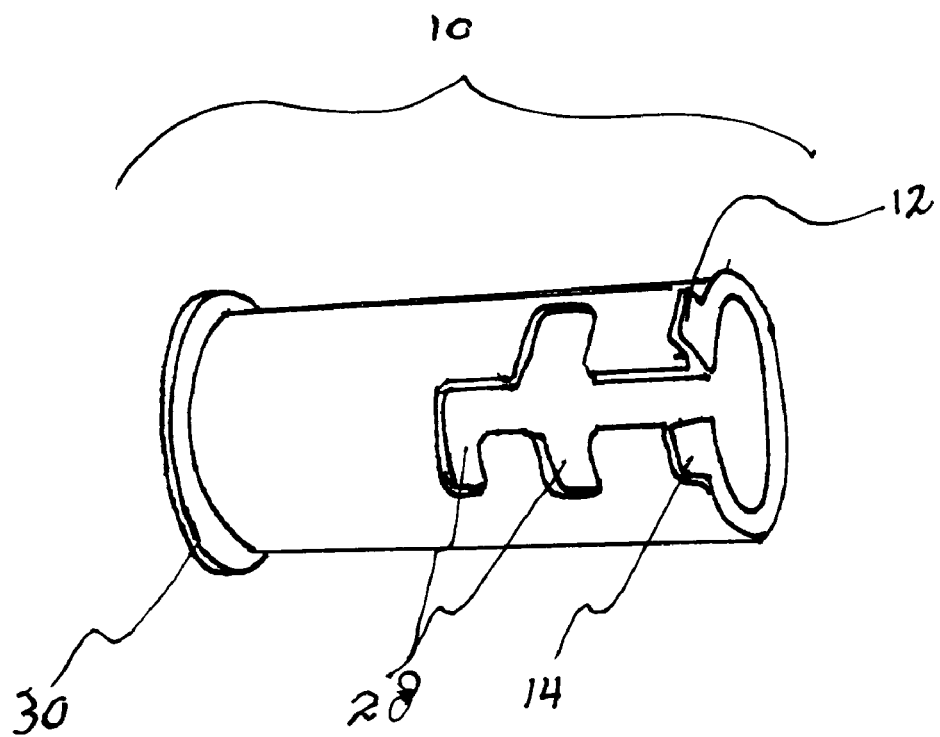
FIG. 2 is a perspective view of the cord retaining tube of the invention.

Referring now to FIG. 1 we see a perspective view of the cord reel assembly of the present invention 100. The assembly consists of a reel 22, a support structure 20 a hand crank 6 and handle 4. The reel 22 is rotatably supported by the support structure 20. The top cross piece 18 of the support structure side walls 22 also acts as a carry handle. An aperture 8 as well as aperture 9 shown in FIG. 4 holds a cord support tube 10. The support tube as shown in FIG. 2 shows that the tube 10 has a flange 30 on one end and a plurality of tabs 12 on the opposite end. The user can squeeze the tabs together to slide the tube 10 into the reel side walls 21, 22 and then release the tabs 12 to have the tube remain in place for use. The tube 10 includes an undulating track 28 that can retain the cord so that there is no stress on the plug when the user pulls on the cord 32. In an alternate embodiment, the tube 10 can be installed as a permanent part of the reel 22. However, the ability to remove tube 10 makes it much easier for the user to install the cord 32 and attached plug 16.

Figure 3:
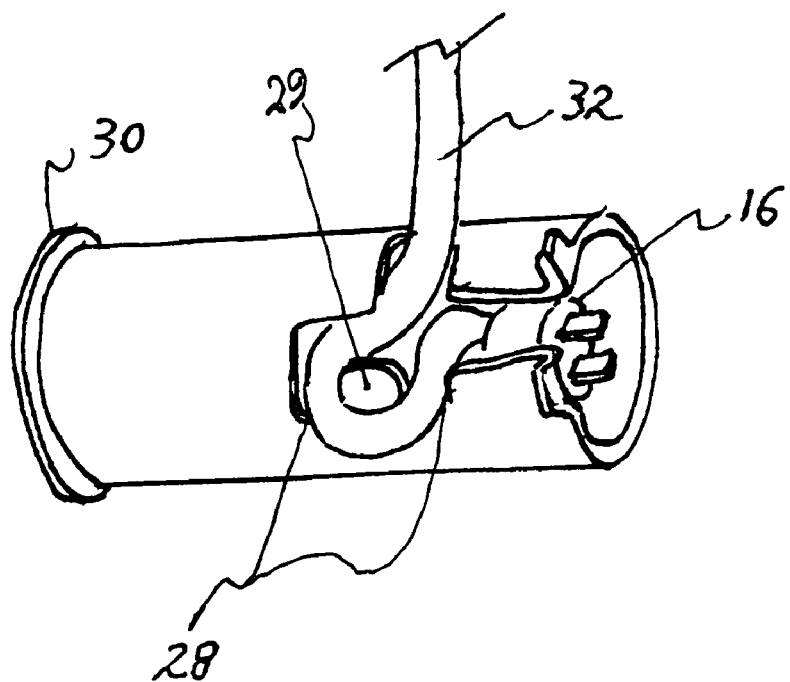
FIG. 3 is perspective view of the cord retaining tube showing the cord in place.

FIG. 3 shows the cord 32 in place and showing the loop in the cord 32 wrapped around a finger 29 that causes the strain relief function.

Referring back to FIG. 1, inverted U shaped member 24 forms an aperture that the cord 32 must pass through during the reeling in process. This aperture 24 keeps the cord from wandering outside the boundaries of the reel walls 22, 21 when the user turns the crank 6 and crank handle 4 to reel in the cord 32.

Figure 4:
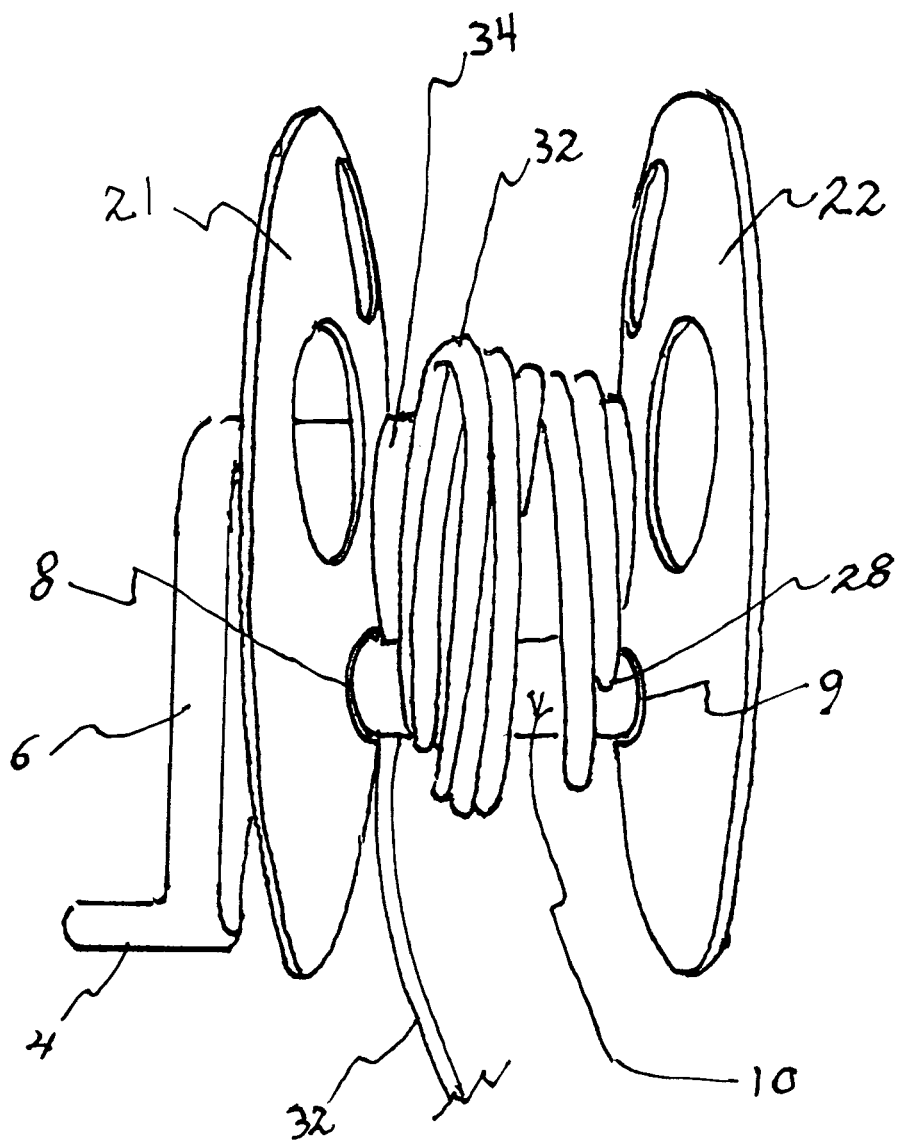
FIG. 4 is a perspective view of the reel portion of the invention with a cord rolled onto the reel.

It should be noted that the user can decide to house either the plug portion 16 or the receptacle portion, not shown, of the electrical cord within the cord tube 10. FIG. 4 is a view of the reel consisting of a central shaft 34, a left side wall 21 and a right side wall 22. The cord tube 10 is snapped into place within apertures 8 and 9. Other standard means of retaining the cord tube 10 may be used such as hinged retaining C clips or hook and loop fasteners.

Base structure 2 has a wide footprint and the reel 22 is placed so that it has a low center of gravity so that when a user pulls on the cord 32, the reel assembly will not topple over. Additionally, the downwardly facing feet 26 provide resistance to a grassy surface or a hard cement surface so that the user can pull out cord 32 without pulling the entire reel assembly 100 with it. Spikes can be added to the downwardly facing legs for use on grass or other soft surface, and high stiction rubber feet can be added to the legs 26 for use on concrete or other hard surface.

To use the present invention 100, a person can pull out a length of cord 32 so that it reaches the area where the work is being done. Then take a second extension cord and plug one end into a 120 VAC socket and the other end into the plug portion 16 of the cord 32 that is wound onto the reel 22. The user can then plug in any power tool into the receptacle portion of cord 32. Because the cord 32 is installed by the user, it can be of any length as long as it does not exceed the diameter of the reel 22 when rolled up.

Alternately, if the user so desires, he can have the receptacle portion of cord 32 exposed in cord support tube 10. Then he can unroll the cord 32 and plug in the plug portion 16 into a standard AC outlet, and plug any power tool, or an additional extension cord, into the receptacle portion of cord 32 located within cord support tube 10.

The entire assembly 100 is made of light weight plastic so that it is economical to produce and easy to carry. The support assembly can be mounted to a wall via J hooks for storage or for actual use in an indoor setting. The use of the present invention allows a user to move freely within the length of the extended cord and then to easily to wind the extended cord back neatly onto the reel when finished with the task at hand.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. What is claimed is:
an electric cord reel comprising:
a reel;
a crank and handle;
a reel support structure;
a base structure;
a guide aperture;
a cord and plug retaining tube;
said reel rotatably attached to said reel support structure;
said handle fixedly attached to the pivot point of said reel wall;
said support structure fixedly attached to said base structure;
said guide aperture fixedly attached to said base structure so that it is in alignment with the spool portion of said reel;
said cord and plug retaining tube removably attached to left and right apertures in the walls of said reel;
a standard extension cord portion and plug able to be removably retained within said cord and plug retaining tube and
said cord and plug retaining tube includes a flange on one end of said tube and a pair of ninety degree angled tabs on the opposite side of said tube and where a slot between said tabs allows said tube to be compressed thereby allowing said tube to be slid into said left and right apertures of said reel walls and to be removably attached to said walls.

* * * * *